United States Patent
Ren et al.

(10) Patent No.: US 10,469,642 B2
(45) Date of Patent: Nov. 5, 2019

(54) MIDDLE FRAME FOR MOBILE PHONE

(71) Applicant: GUANGDONG EVERWIN PRECISION TECHNOLOGY CO., LTD., Dongguan (CN)

(72) Inventors: Xiangsheng Ren, Dongguan (CN); Lidong Wang, Dongguan (CN); Lilei Wang, Dongguan (CN); Ke Zhang, Dongguan (CN); Hao Huang, Dongguan (CN)

(73) Assignee: GUANGDONG EVERWIN PRECISION TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 16/147,550

(22) Filed: Sep. 28, 2018

(65) Prior Publication Data
US 2019/0222682 A1  Jul. 18, 2019

Related U.S. Application Data

(63) Continuation of application No. PCT/CN2018/078538, filed on Mar. 9, 2018.

(30) Foreign Application Priority Data

Jan. 17, 2018 (CN) .......................... 2018 1 0044293
Jan. 17, 2018 (CN) .......................... 2018 1 0044294
Jan. 17, 2018 (CN) ..................... 2018 2 0080859 U

(51) Int. Cl.
*H04M 1/18* (2006.01)
*H04M 1/02* (2006.01)
*H04B 1/3827* (2015.01)
*H04B 1/38* (2015.01)

(52) U.S. Cl.
CPC ............ *H04M 1/18* (2013.01); *H04B 1/3833* (2013.01); *H04M 1/0249* (2013.01); *H04B 2001/3894* (2013.01)

(58) Field of Classification Search
CPC .... H04M 1/18; H04M 1/0252; H04B 1/3833; H04B 1/3888; H04B 1/086
USPC ....................................................... 455/571.1
See application file for complete search history.

(56) References Cited

U.S. PATENT DOCUMENTS

| 4,719,322 A * | 1/1988 | Guzik ................... H04B 1/086 181/141 |
| 10,291,280 B1 * | 5/2019 | Deng ................... H04B 1/3888 |
| 10,341,472 B2 * | 7/2019 | Guo ..................... H04B 1/3833 |

(Continued)

*Primary Examiner* — William D Cumming
(74) *Attorney, Agent, or Firm* — Kilpatrick Townsend & Stockton LLP

(57) ABSTRACT

A middle frame for a mobile phone, includes a middle plate, and an edge of the middle plate forms a latching portion. A boarder frame defining a latching groove on a side thereof facing the middle plate, and the latching portion is riveted in the latching groove. The middle plate and the border frame form a first seam and a second seam on a junction portion and the middle plate and the border frame are provided with a first mounting groove and a second mounting groove. The first seam is located in the first mounting groove, the second seam is located in the second mounting groove. First and second sealing elements, and the first sealing element is filled in the first mounting groove, and the second sealing element is filled in the second mounting groove.

20 Claims, 4 Drawing Sheets

(56) References Cited

U.S. PATENT DOCUMENTS

| | | | |
|---|---|---|---|
| 2012/0165081 A1* | 6/2012 | Ushigome | H04M 1/0252 |
| | | | 455/575.1 |
| 2019/0116249 A1* | 4/2019 | Guo | H04B 1/3833 |
| 2019/0222682 A1* | 7/2019 | Ren | H04M 1/18 |

* cited by examiner

MIDDLE FRAME FOR MOBILE PHONE

CROSS-REFERENCE TO RELATED APPLICATION

The present application is a continuation application of International Application No. PCT/CN2018/078538, filed on Mar. 9, 2018, which claims the benefit of Chinese Patent Application No. 2018100442931, filed on Jan. 17, 2018, entitled "Middle Frame for Mobile Phone", Chinese Patent Application No. 2018200808591, filed on Jan. 17, 2018, entitled "Middle Frame for Mobile Phone", and Chinese Patent Application No. 2018100442946, filed on Jan. 17, 2018, entitled "Middle Frame for Mobile Phone", the entire content of which are incorporated herein in their entireties.

TECHNICAL FIELD

The present disclosure relates to the technical field of mobile phone processing, and particularly relates to a middle frame for a mobile phone.

BACKGROUND

As a most important communication tool for people, mobile phones have brought great convenience to people's lives. A conventional mobile phone is assembled with a metal middle frame and a rear cover, so as to meet customer's demand for a metal texture of mobile phone. In daily life, the mobile phone is inevitable to encounter some collisions and liquid immersions. Since the mobile phone is assembled with parts such as rear plate, metal middle frame, panel and the like, and the parts are assembled via embedding or riveting, liquid can permeate into the circuit in the mobile phone through the seals between the gaps and cause a short circuit, which may result in the mobile phone not being able to be used normally. To address the aforementioned problem, a phone case is used to sleeve on the mobile, the phone case seemingly solves the waterproof problem, but the phone case also prevents user's hands from directly contact with the mobile phone, and the operation feel to the mobile phone is reduced.

SUMMARY

According to various embodiments of present disclosure, a middle frame for a mobile phone is provided.

A middle frame for a mobile phone includes a middle plate having an edge thereof forms a latching portion; a boarder frame defining a latching groove on a side thereof facing the middle plate, and the latching portion is riveted to the latching groove, the middle plate and the border frame form a first seam and a second seam on a junction portion therebetween, and the middle plate and the border frame are provided with a first mounting groove and a second mounting groove therebetween, the first seam is located in the first mounting groove, the second seam is located in the second mounting groove; and first and second sealing elements, and the first sealing element is filled in the first mounting groove, and the second sealing element is filled in the second mounting groove.

A middle frame for a mobile phone includes a middle plate, an edge of the middle plate forms a latching portion; a boarder frame defining a latching groove on a side thereof facing the middle plate, the latching portion is riveted to the latching groove, the middle plate and the border frame are provided with a first mounting groove and a second mounting groove therebetween, and the first mounting groove and the second mounting groove are provided on both sides of the middle plate, respectively; and first and second sealing elements, the first sealing element is filled in the first mounting groove, and the second sealing element is filled in the second mounting groove.

A middle frame for a mobile phone includes a middle plate, an edge of the middle plate forms a latching portion; a boarder frame defining a latching groove on a side thereof facing the middle plate defines a latching groove, the latching portion is riveted to the latching groove, the middle plate and the border frame are provided with a first mounting groove and a second mounting groove therebetween, and the first mounting groove and the second mounting groove are provided on both sides of the border frame, respectively; and first and second sealing elements, wherein the first sealing element is filled in the first mounting groove, and the second sealing element is filled in the second mounting groove.

The details of one or more embodiments of present disclosure are set forth in the accompanying drawings and the description below. Other features, objects, and advantages of present disclosure will be apparent from the description and drawings, and from the claims.

BRIEF DESCRIPTION OF THE DRAWINGS

To illustrate the embodiments and/or examples according to present disclosure more clearly, the accompanying drawings for describing the embodiments or the prior art are introduced briefly in the following. Additional details or examples are not intended to limit the scope of present disclosure, the illustrated embodiments and/or a best mode in any manner.

DETAILED DESCRIPTION OF THE EMBODIMENTS

Embodiments of the present disclosure are described more fully hereinafter with reference to the accompanying drawings. A preferred embodiment is described in the accompanying drawings. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

It will be understood that when an element is referred to as being "fixed" to another element, it can be directly fixed to the other element or intervening elements may be presented. Also, when an element is referred to as being "connected" or "coupled" to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. The terms used herein is for the purpose of describing particular embodiments only and is not intended to limit the present disclosure.

Figure 1:
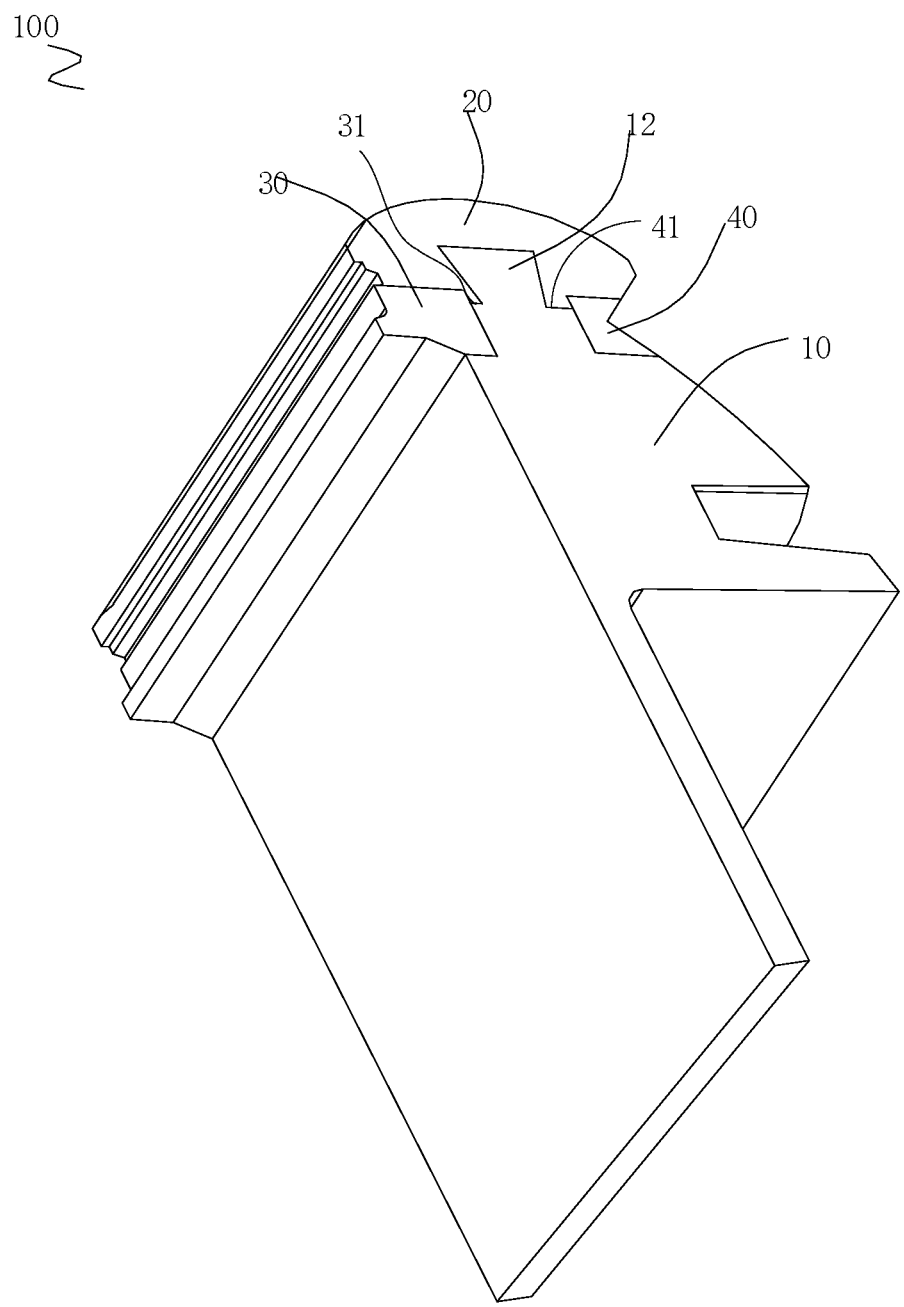
FIG. 1 is a perspective view of a middle frame for a mobile phone according to a first embodiment.
Figure 2:
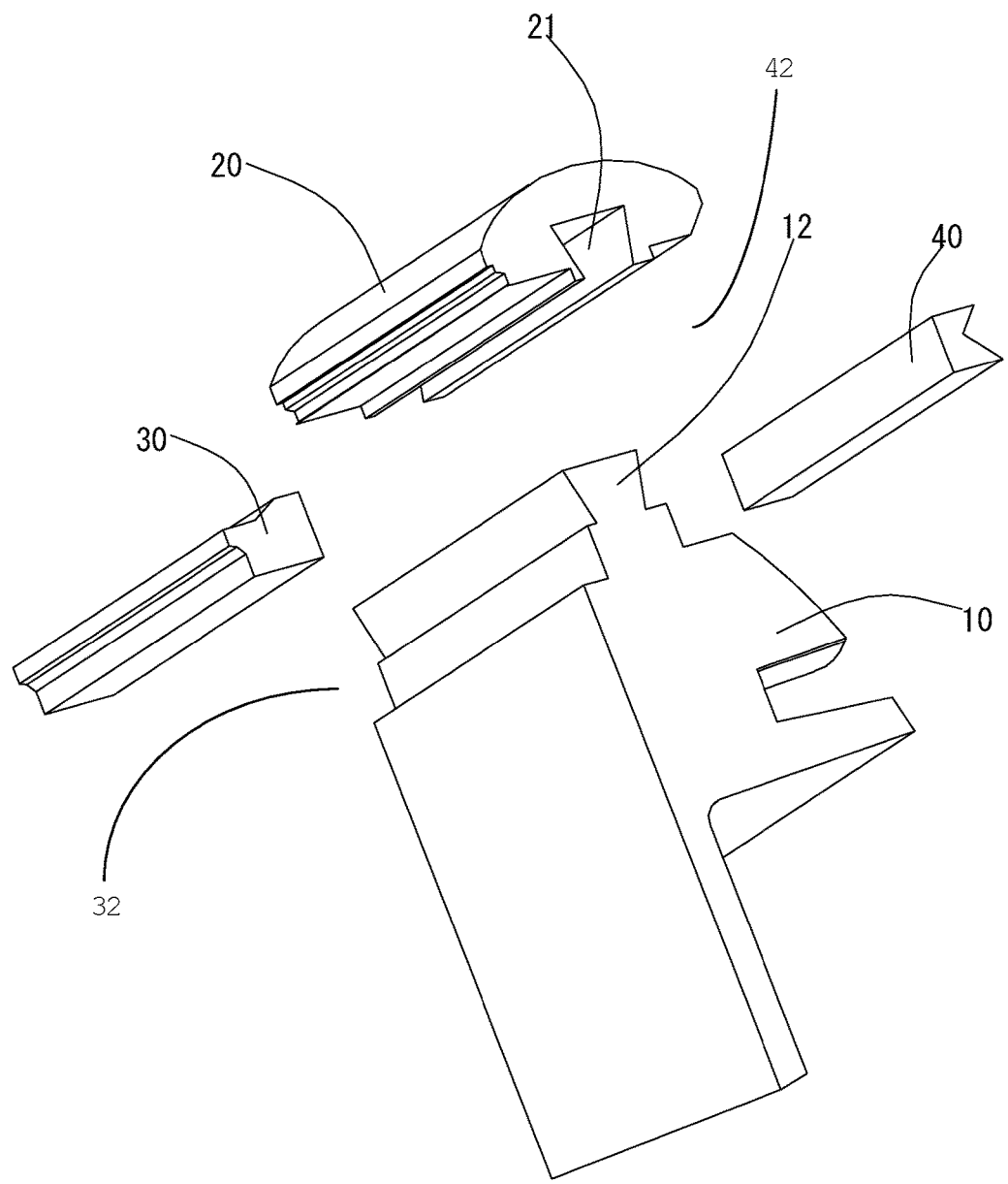
FIG. 2 is an exploded view of the middle frame for the mobile phone of FIG. 1.

Referring to FIG. 1 and FIG. 2, a middle frame 100 for a mobile phone according to an embodiment includes a middle plate 10, a border frame 20 connected to the middle plate 10, a first sealing element 30, and a second element 40. During the assembly, the first sealing element 30 is used to abut against a panel, and the second sealing element 20 is used to abut against a back plate, such that parts of the mobile phone are tightly connected with good waterproof performance.

The middle plate 10 and the border frame 20 are both made of metal materials, and have structures such as a steel-aluminum engaging structure, an aluminum-aluminum engaging structure, and a titanium-aluminum engaging structure, so as to meet the consumer's demand for a metal texture of the mobile phone.

An edge of the middle plate 10 facing the border frame 20 forms a latching portion 12. An outer end of the latching portion 12 is gradually enlarged along a direction toward the border frame 20, i.e., a width of the end of the latching portion 12 facing the border frame 20 is greater than a width of the end of the latching portion 12 away from the border frame 20. In an alternative embodiment, the outer end of the latching portion 12 has a shape of truncated cone or frustum pyramid to facilitate latching. In other embodiments, the latching portion 12 can be, but not limited to, spherical crown shaped or T-shaped.

The side of the border frame 20 facing the middle plate 10 defines at least one latching groove 21 to connect the latching portion 12 of the middle plate 10. A size of the latching groove 21 is corresponding to a size of the outer end of the latching portion 12, such that the border frame 20 can be tightly connected to the middle plate 10. In one of the embodiments, a width of the latching groove 21 is gradually decreased along a direction from the border frame 20 towards the middle plate 10. Specifically, the latching groove 21 is a dovetail groove.

The middle plate 10 and the border frame 20 form a first seam 31 and a second seam 41 on a junction portion between the middle plate 10 and the border frame 20. A first mounting groove and a second mounting groove are provided between the middle plate 10 and the border frame 20. The first seam 31 is located in the first mounting groove, and the second seam 41 is located in the second mounting groove.

The first sealing element 30 is filled in the first mounting groove and is connected to the middle plate 10 and the border frame 20, and the second sealing element 40 is filled in the second mounting groove and is connected to the middle plate 10 and the border frame 20. The first mounting groove is partially provided on the middle plate 10, and is partially provided on the border frame 20, the second mounting groove is partially provided on the middle plate 10, and is partially provided on the border frame 20. In an alternative embodiment, the first mounting groove and the second mounting groove are provided on both sides of the middle plate 10, respectively. In yet another embodiment, the first mounting groove and the second mounting groove are provided on both sides of the border frame 20, respectively. It should be understood that, a bottom surface of the first mounting groove can be planar, concave, or convex, as long as it is engaged with a bottom surface of the first sealing element, such that the bottom of the first sealing element 30 fits the bottom surface of the first mounting groove. Similarly, a bottom surface of the first mounting groove can be planar, concave, or convex.

In one of the embodiments, the first mounting groove has a depth ranging from 0.6 mm to 1.1 mm, and a width ranging from 0.8 mm to 1.2 mm. In an alternative embodiment, the width of the first mounting groove is gradually decreased along a direction away from the latching groove 21. The second mounting groove has the same depth as the depth of the first mounting groove, and the second mounting groove has the same width as the width of the first mounting groove.

The first sealing element 30 and the second sealing element 40 are both used to connect the middle plate and the border frame 20, and the first sealing element 30 and the second sealing element 40 are both made of a plastic material. In one of the embodiments, the plastic material is a polyether plastic with a molecular main chain containing a phenylthio group. Specifically, the plastic material is a phenylenesulfide (PPS). Phenylenesulfide is a linear or slightly branched high polymer consisted of alternately arranged benzene rings and sulfur atoms, the molecular chain has a strong regularity, and the main chain connected with the rigid benzene rings and the flexible sulfur atoms has the characteristics of both rigidity and flexibility. Since the benzene rings and the sulfur atoms are conjugate, and the sulfur atoms are not saturated, the thioether bond can be converted into a sulfoxide group by oxidation, or adjacent macromolecules can form an oxygen bridge branching or cross-linking, thereby making a thermo-oxidative stability prominent. Since the polarity of the sulfur atoms is bound by conjugated benzene rings and high crystallinity, the PPS is characterized by non-polarity or weak polarity, thereby making the insulativity, dielectricity, and chemical resistance of PPS also prominent. In an alternative embodiment, the PPS is added with a glass fiber (GF) of 45% by weight. Adding of the glass fiber limits mutual movements between macromolecular chains in the plastic, therefore the shrinkage rate of the reinforced plastic is significantly reduced, and the rigidity is also improved.

During the assembly, the first sealing element 30 and the second sealing element 40 can be directly manufactured, then be filled into the first mounting groove and the second mounting groove, respectively. However, to achieve a better sealing effect of the border frame 20 and the middle plate 10, the first mounting groove and the second mounting groove are preserved on the middle plate 10, or are preserved on a connecting portion between the middle plate 10 and the border frame 20, then the first sealing element 30 and the second sealing element 40 are integrally formed via an injection molding process. In this way, the middle frame for the mobile phone can achieve a good waterproof performance, the effect on the interior of the mobile phone caused by outer water seepage is structurally eliminated, and the problem of poor waterproof property caused by outer abrasion is solved, thereby the waterproof period of the product is significantly increased. During the injection, the process parameters of the injection molding machine are: environmental temperature is 15° C. to 35° C., raw material temperature is 280° C. to 330° C., mold temperature is 140° C. to 160° C., billet temperature is 140° C. to 160° C., hot runner temperature is 250° C. to 270° C.; filling speed is 60 mm/s to 180 mm/s, melting time is 8 s to 10 s, filling time is 0.15 s to 0.25 s, cooling time is 10 s to 15 s, dwell time 1 s is to 5 s, opening and closing time is 2 s to 3.5 s, taking out time is 5 s to 10 s; back pressure (melting pressure) is 5 MPa to 10 MPa, injection pressure is 100 MPa to 250 MPa, dwell pressure is 50 MPa to 150 MPa, clamping pressure is 12 MPa to 16 MPa, ejection pressure is 3 MPa to 5 MPa; and glue volume is 50 cm$^3$ to 60 cm$^3$.

Figure 3:
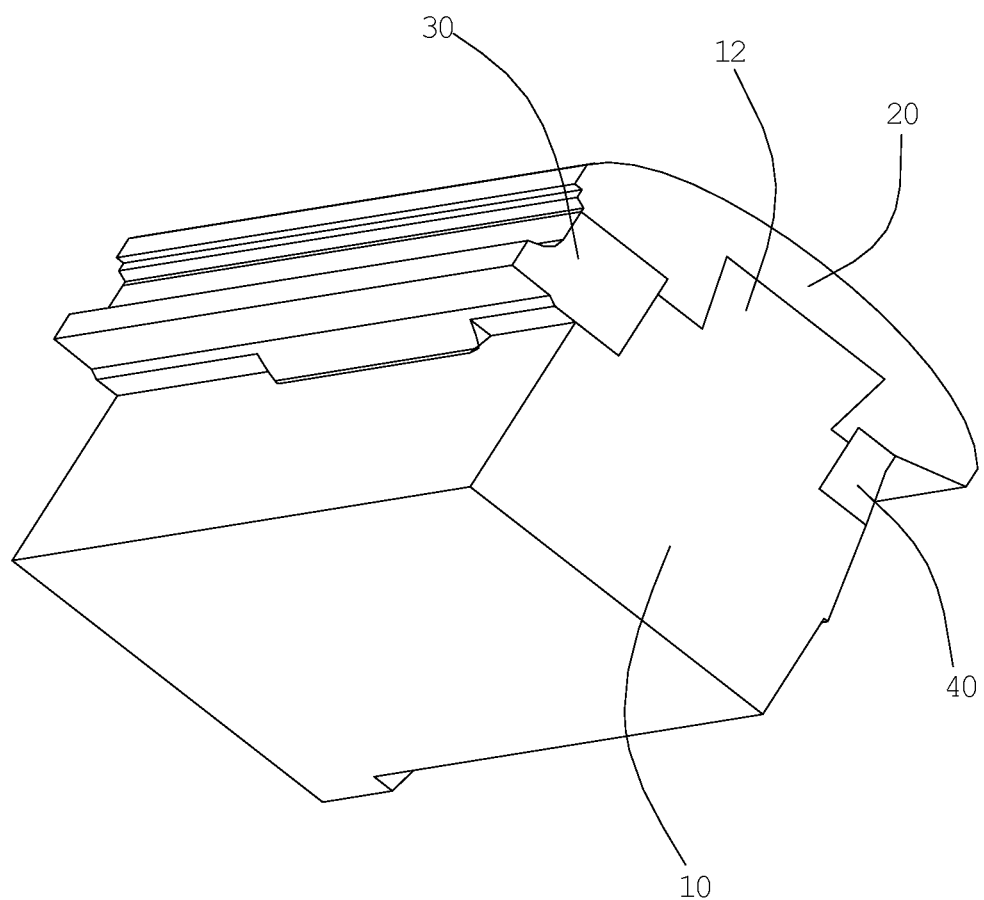
FIG. 3 is a perspective view of a middle frame for a mobile phone according to a second embodiment.
Figure 4:
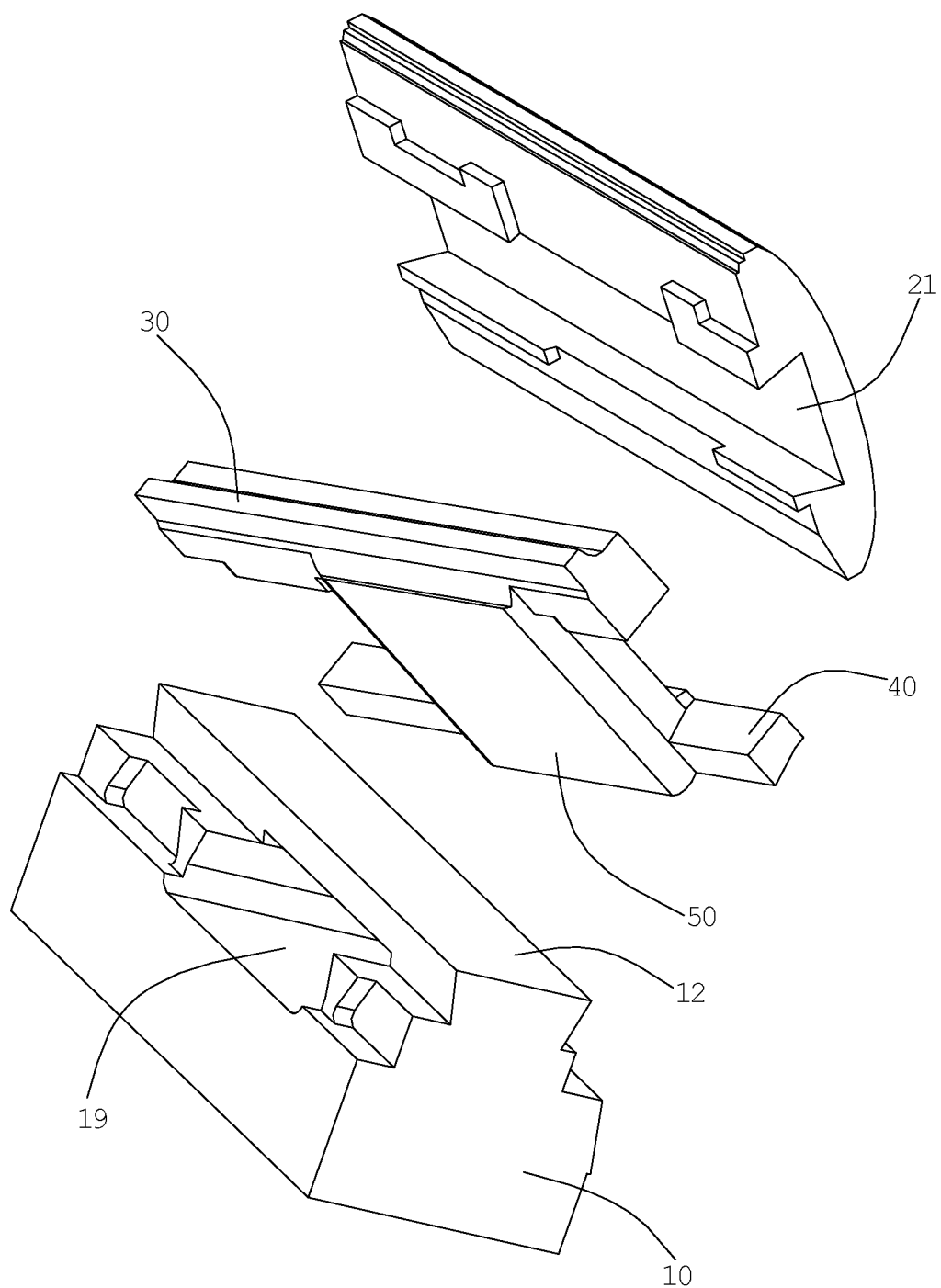
FIG. 4 is an exploded view of the middle frame for the mobile phone of FIG. 3.

Referring to FIG. 3 and FIG. 4, the middle frame 100 for the mobile phone according to an alternative embodiment differs from the aforementioned embodiment in that:

The middle frame 100 for the mobile phone further includes a third sealing element 50 connecting the first sealing element 30 and the second sealing element 40. The third sealing element 50, the first sealing element 30, and the second sealing element 40 are integrally formed via an injection molding process, and the third sealing element 50, the first sealing element 30, and the second sealing element 40 are made of the same material. The connection of the third sealing element 50 structurally improves the combination performance of the first sealing element 30 and the second sealing element 40, and improves the stability of the injection molded structure. It should be understood that, the connection of the third sealing element 50 to the first sealing element 30 and the second sealing element 40 can be riveting or other means of connection.

In one of the embodiments, the middle plate 10 defines at least one receiving groove 19 to receive the third sealing element 50. In an alternative embodiment, the receiving groove 19 has a depth ranging from 0.8 mm to 1.2 mm, a minimal width ranging from 4.6 mm to 5.1 mm, and a maximal width ranging from 5.2 mm to 5.7 mm. In some embodiments, the first sealing element 30 includes at least one first fixing portion (not labeled), and a first fixing groove is provided between the middle plate 10 and the border frame 20 to receive the first fixing portion, so as to enhance the mounting of the first sealing element 30. Similarly, the second sealing element 40 includes at least one second fixing portion, and a second fixing groove is provided between the middle plate 10 and the border frame 20 to receive the second fixing portion.

The aforementioned middle frame 100 for the mobile phone has a simple structure, the first sealing element 30 and the second sealing element 40 are both used to connect the middle plate 10 and the border frame 20, so as to enhance the connection between the middle plate 10 and the border frame 20, and also to make the connection between the middle frame, the front panel, and the read panel tighter. In this way, the user's hands can directly contact with the mobile phone, the operation feel is improved and the waterproof function prevents the water from permeating into the mobile phone.

The technical features of the embodiments described above can be arbitrarily combined. In order to make the description succinct, there is no describing of all possible combinations of the various technical features in the foregoing embodiments. It should be noted that there is no contradiction in the combination of these technical features which should be considered as the scope of the description.

Although the present disclosure is illustrated and described herein with reference to specific embodiments, the present disclosure is not intended to be limited to the details shown. It should be noted that, various modifications may be made in the details within the scope and range of equivalents of the claims and without departing from the present disclosure. Therefore, the protection scope of the present disclosure shall be subject to the protection scope of the claims.

What is claimed is:

1. A middle frame for a mobile phone, comprising:
   a middle plate, wherein an edge of the middle plate forms a latching portion;
   a boarder frame defining a latching groove on a side thereof facing the middle plate, wherein the latching portion is riveted in the latching groove, the middle plate and the border frame form a first seam and a second seam on a junction portion therebetween;
   and the middle plate and the border frame are provided with a first mounting groove and a second mounting groove therebetween, the first seam is located in the first mounting groove, the second seam is located in the second mounting groove; and
   first and second sealing elements, wherein the first sealing element is filled in the first mounting groove, and the second sealing element is filled in the second mounting groove.

2. The middle frame for the mobile phone according to claim 1, wherein the first mounting groove is partially provided on the middle plate and is partially provided on the border frame, the second mounting groove is partially provided on the middle plate and is partially provided on the border frame.

3. The middle frame for the mobile phone according to claim 1, wherein the first mounting groove has a depth ranging from 0.6 mm to 1.1 mm, and the first mounting groove has a width ranging from 0.8 mm to 1.2 mm.

4. The middle frame for the mobile phone according to claim 3, wherein the depth of the first mounting groove is gradually decreased along a direction away from the latching groove.

5. The middle frame for the mobile phone according to claim 3, wherein the second mounting groove has the same depth as the depth of the first mounting groove, and the second mounting groove has the same width as the width of the first mounting groove.

6. The middle frame for the mobile phone according to claim 1, wherein a width of the latching groove is gradually decreased along a direction from the border frame towards the middle plate.

7. The middle frame for the mobile phone according to claim 6, wherein a width of one end of the latching portion facing the border frame is greater than a width of the other end of the latching portion away from the border frame.

8. The middle frame for the mobile phone according to claim 1, further comprising a third sealing element connecting the first sealing element and the second sealing element, wherein the third sealing element, the first sealing element, and the second sealing element are integrally formed via an injection molding process.

9. The middle frame for the mobile phone according to claim 1, further comprising a third sealing element connecting the first sealing element and the second sealing element, wherein the third sealing element, the first sealing element, and the second sealing element are connected via riveting.

10. The middle frame for the mobile phone according to claim 8, wherein the middle plate defines at least one receiving groove to receive the third sealing element.

11. The middle frame for the mobile phone according to claim 10, wherein the receiving groove has a depth ranging from 0.8 mm to 1.2 mm, a minimal width ranging from 4.6 mm to 5.1 mm, and a maximal width ranging from 5.2 mm to 5.7 mm.

12. The middle frame for the mobile phone according to claim 1, wherein the first sealing element comprises at least one first fixing portion, and the middle plate and the border frame are provided with a first fixing groove therebetween to receive the first fixing portion.

13. The middle frame for the mobile phone according to claim 1, wherein the second sealing element comprises at least one second fixing portion, and the middle plate and the border frame are provided with a second fixing groove therebetween to receive the second fixing portion.

14. The middle frame for the mobile phone according to claim 1, wherein the first sealing element, the second sealing element, and the third sealing element are made of plastic.

15. A middle frame for a mobile phone, comprising:
a middle plate, wherein an edge of the middle plate forms a latching portion;
a boarder frame defining a latching groove on a side thereof facing the middle plate, wherein the latching portion is riveted in the latching groove, the middle plate and the border frame are provided with a first mounting groove and a second mounting groove therebetween, and the first mounting groove and the second mounting groove are provided on both sides of the middle plate, respectively; and
first and a second sealing elements, wherein the first sealing element is filled in the first mounting groove, and the second sealing element is filled in the second mounting groove.

16. The middle frame for the mobile phone according to claim 15, further comprising a third sealing element connecting the first sealing element and the second sealing element, wherein the third sealing element, the first sealing element, and the second sealing element are integrally formed via an injection molding process.

17. The middle frame for the mobile phone according to claim 15, further comprising a third sealing element connecting the first sealing element and the second sealing element, wherein the third sealing element, the first sealing element, and the second sealing element are connected via riveting.

18. A middle frame for a mobile phone, comprising:
a middle plate, wherein an end of the middle plate forms a latching portion;
a boarder frame defining a latching groove on a side thereof facing the middle plate, wherein the latching portion is riveted into the latching groove, the middle plate and the border frame are provided with a first mounting groove and a second mounting groove therebetween, and the first mounting groove and the second mounting groove are provided on both sides of the border frame, respectively; and
first and a second sealing elements, wherein the first sealing element is filled in the first mounting groove, and the second sealing element is filled in the second mounting groove.

19. The middle frame for the mobile phone according to claim 18, further comprising a third sealing element connecting the first sealing element and the second sealing element, wherein the third sealing element, the first sealing element, and the second sealing element are integrally formed via an injection molding process.

20. The middle frame for the mobile phone according to claim 18, further comprising a third sealing element connecting the first sealing element and the second sealing element, wherein the third sealing element, the first sealing element, and the second sealing element are connected via riveting.

* * * * *